Nov. 8, 1927.

E. C. HERTHEL ET AL 1,648,585

RECOVERY OF GASOLINE

Filed July 5, 1924   4 Sheets-Sheet 3

Fig. 3.

INVENTORS
Thomas deColon Tifft
Eugene C. Herthel
Pennie, Davis, Marvin & Edmonds
ATTORNEYS Nov. 8, 1927. 1,648,585
E. C. HERTHEL ET AL
RECOVERY OF GASOLINE
Filed July 5, 1924 4 Sheets-Sheet 4

INVENTORS
Thomas de Colon Tifft
Eugene C. Herthel
BY
Pennie, Davis, Marvin & Edmonds
ATTORNEYS Patented Nov. 8, 1927.

1,648,585

UNITED STATES PATENT OFFICE.

EUGENE C. HERTHEL AND THOMAS DE COLON TIFFT, OF CHICAGO, ILLINOIS, ASSIGNORS TO SINCLAIR OIL AND GAS COMPANY, OF TULSA, OKLAHOMA, A CORPORATION OF MAINE.

RECOVERY OF GASOLINE.

Application filed July 5, 1924. Serial No. 724,199.

This invention relates to recovery from natural gas and casinghead gas of liquid mixtures of hydrocarbons of the type commonly known as natural gas gasoline, natural gasoline, and casinghead gasoline. These liquid hydrocarbon mixtures are of a light gasoline character and are particularly adapted for use in blended motor fuels in admixture with heavier hydrocarbons. Among the objects of the invention is the provision of an improved process and apparatus for the recovery of such hydrocarbons.

This invention relates particularly to an improved method and apparatus for use in the recovery of natural gas gasoline and the like by absorption in a liquid absorbing medium, and to an improved method and apparatus for separating the absorbed vapors from the liquid absorbent.

Briefly, in recovering natural gas gasoline from natural gas, or similar gaseous mixtures, by absorption in a liquid menstruum, the natural gas is subjected to treatment with a liquid absorbent capable of selectively dissolving or entraining the gasoline constituents, the stripped gas and the absorbent charged with gasoline are separated, the absorbed gasoline, or as great a part as possible or practicable, is distilled from the absorbent, the denuded absorbent is cooled and returned for further treatment of an additional quantity of natural gas, and the separated gasoline is condensed and collected.

In the Patent No. 1,560,137 granted to Harold B. Bernard, November 3, 1925, there is described an improved method and apparatus in which the liquid absorbent charged with absorbed gasoline following the absorption treatment is preheated or subjected to a preliminary distillation treatment under pressure wherein an initial separation of gases, vapors and liquids is effected, the pressure upon the separated gases, vapors and liquid is reduced, and the preheated liquid is then passed in counter current flow and in direct contact with the preheated gases and vapors under a lower pressure than that prevailing during the preliminary distillation treatment.

The present invention involves a further improvement upon the process and apparatus of said application, and similarly involves preheating or preliminary distilling the gasoline charged absorbent and effecting an initial separation of gases, vapors and liquids reducing the pressure upon the separated gases, vapors and liquid, and passing the preheated liquid from the preliminary distillation in counter current flow and in direct contact with the preheated gases and vapors from the preliminary distillation under a lower pressure than that prevailing during the preliminary treatment.

Among the advantages of effecting the separation of the absorbent and the absorbed gasoline in two steps, the first a partial vaporization under a higher pressure and the second a direct contacting in countercurrent flow of the vapors and gases and the liquid separated in the first, are improved efficiency of separation and more complete stripping of the absorbent, improved economy in heating and cooling required, better controlled operation, apparatus of smaller capacity and employing less power for any given recovery or for the treatment of any given amount of gas, and an improved and more uniform product.

More particularly, the present invention relates to an improved method and apparatus for regulating the pressure in the preliminary distillation and reducing the pressure between the distillation treatment and the exhausting treatment, and for regulating the flow from the preliminary distillation to the exhausting treatment. The invention includes improvements in the method and apparatus for regulating and reducing the pressure and for regulating the flow in processes and apparatus for recovering gasoline from natural gas, casinghead gas and the like.

According to the present invention, the hydrostatic pressure of a column of liquid is employed for maintaining the pressure in the preliminary distillation treatment and for equalizing the pressure reduction upon the separated vapors and gases and the liquid, and the pressure reduction is controlled by regulating the hydrostatic head of the liquid column.

According to the process of the present invention, the liquid from the preliminary distillation treatment is discharged into the receptacle in which the exhausting treatment is effected at a point above the liquid level in the still in which the preliminary distillation is effected, and the distilled vapors and gases are discharged into the exhausting receptacle through a corresponding liquid column of equal hydrostatic head. By affording free communication between the liquid column through which the vapors and gases are discharged and the liquid in the preliminary still, the pressure reduction upon the liquid and upon the vapors and gases is equalized. The pressure in the preliminary distillation is maintained in excess of that in the exhausting treatment by an amount equal to the hydrostatic pressure corresponding to the liquid column between the liquid level in the preliminary still and the elevated point of liquid discharge into the exhausting receptacle, and the pressure upon the vapors, gases and liquid is reduced before discharge into the exhausting receptacle by a corresponding amount plus the friction head of the connections between the preliminary still and the exhausting column.

In one embodiment of the apparatus of the invention, a connection is provided for discharging liquid from the preliminary still into the upper end of a vertically arranged exhausting column at a point elevated above the liquid level in the still a distance corresponding to the desired pressure reduction, a closed vertical cylinder communicating with the liquid in the still is arranged extending above the liquid inlet to the exhausting column, a connection is provided for discharging vapors and gases from the preliminary still into this cylinder at a point corresponding to the liquid level in the still, and a connection is provided for discharging the vapors and gases from the upper end of the cylinder into the lower end of the exhausting column.

By arranging the equalizing liquid column through which the vapors and gases form the preliminary distillation are discharged with its upper level corresponding to the point of liquid discharge into the exhausting receptacle, the liquid level in the preliminary still is automatically maintained at a point corresponding to the point of introduction of the vapors and gases into the equalizing liquid column, and the level in the preliminary still can be controlled by regulating the level at which the vapors and gases from the preliminary distillation are discharged into the equalizing column.

The invention will be further described in connection with the accompanying drawings illustrating embodiments of the apparatus of the invention adapted for use in practicing the process of the invention; but it is intended and will be understood that this illustration and further description is for the purpose of illustrating the invention and that the invention is not limited thereto.

Figure 1:
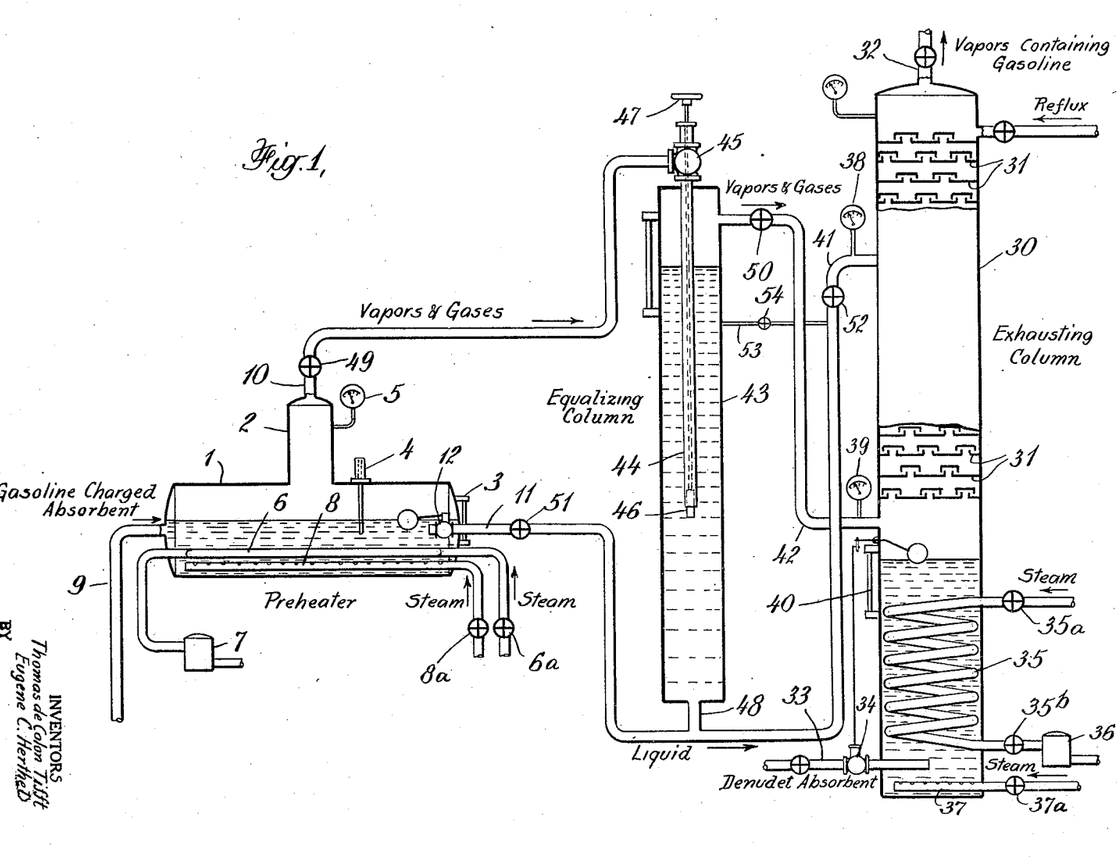
Fig. 1 diagrammatically represents in elevation and partly in section a preheating still and an exhausting column connected with an equalizing column embodying the invention and adpated for carrying out the invention.

Referring to Fig. 1, the preheater or preliminary still comprises a shell 1 having a vapor dome 2 and is provided with the usual accessories including a level gauge 3, a thermometer 4 and a pressure gauge 5. A steam coil 6 connected on its discharge end with a steam trap 7 is provided below the normal liquid level for heating the contents of the still and a perforated pipe 8 extending along the bottom of the shell is provided for introducing steam directly into the charge in the preheater. Valves $6^a$ and $8^a$ are provided for controlling the steam coil and the steam injection pipe 8 respectively. Connection 9 is provided for introducing the gasoline charged absorbent into the preheater. The liberated vapors and gases escape from the preheater through connection 10 and the hot liquid residuum is discharged through connection 11.

The exhausting column illustrated in Fig. 1 is of bubble tower construction and comprises a vertical shell 30 having an extended series of bubble plates 31 therein and is arranged with a liquid reservoir in the lower end. The vapor and gas connection 42 from the preheater enters the tower below the lowermost bubble plate and the liquid connection 41 from the preheater is arranged to discharge into the tower at a point above the liquid level in the preheater and somewhat below the uppermost bubble plate. The space within the tower between the connections 41 and 42 thus serves as an exhausting receptacle and the space above the connection 41 as a rectifying receptacle. The gasoline containing vapors from the rectifier escape through connection 32 and the denuded absorbent is withdrawn through connection 33. A float actuated valve 34 is provided in the outlet 33 to maintain the level in the liquid reservoir at the base of the column below the gas and vapor inlet and above the outlet 33. A steam coil 35 for supplying additional heat, for example, to make up for heat losses in the connections between the preheater and the exhausting column, is provided in the lower part of the column. The steam coil is controlled by valves 35ª and 35ᵇ and is connected on its outlet end with steam trap 36. A perforated pipe 37 controlled by valve 37ª is also provided in the base of the tower for the direct introduction of live steam. Pressure gauges 38 and 39 are provided in the connections 41 and 42 respectively adjacent the inlet to the column and a level gauge 40 is provided for indicating the liquid level in the liquid reservoir.

An equalizing column is interposed between the preheater 1 and the exhausting column 30 for maintaining the pressure in the preheater and for reducing the pressure between the preheater and the exhausting column. This equalizing column comprises a closed vertical cylinder 43 extending above the liquid inlet 41 to the exhausting column and below the liquid level in the preheater, and a downwardly extending pipe 44 arranged within the cylinder 43 extending to a point approximately on a level with the liquid level in the preheater. The vapor and gas connection from the preheater 1 is connected to the pipe 44 through angle connection 45. A sliding nipple 46 is provided in the lower end of the pipe 44 for regulating the liquid level in the preheater and a hand wheel 47 is arranged for vertical adjustment of the nipple 46. A connection 48 is provided between the lower end of the column 43 and the connection between the outlet 11 from the preheater and the connection 41 to the exhausting column. A float actuated valve 12 on the outlet to the connection 11 assists in controlling the discharge from the preheater and in maintaining the liquid level in the preheater. Valves 49 and 50 are interposed in the vapor and gas connections between the preheater and the equalizing column and the equalizing column and the exhausting column respectively, and valves 51 and 52 in the liquid connections between the preheater and the equalizing column and the equalizing column and the exhausting column respectively. A bleeder connection 53, having a control valve 54, is provided between the equalizing column at a point just below the normal liquid level therein and the connection 41 at a point adjacent the inlet to the exhausting column.

In operation, the gasoline charged absorbent is continuously introduced into the preheater where it is heated under pressure and a partial vaporation of the absorbed constituents is effected. Where heat is applied only in the preheater, sufficient heat, that is the quantum of heat, should be introduced to vaporize all of the gasoline content from the absorbent and to make up for any heat losses, although complete vaporization of the absorbed gasoline constituents may not be effected in the preheater. Where heat is applied at other points, as in the exhausting column, the amount of heat introduced in the preheater may be somewhat less. Sufficient vaporization may also be effected at a somewhat lower temperature by the direct introduction of steam. Due to the relatively higher pressure in the preheater, a selective vaporization of the lighter absorbed constituents is effected therein and vaporization or entrainment of the absorbent is avoided or minimized, even where a relatively light absorbent is employed. The pressure upon the vapors and gases and the liquid is then reduced and the heated and separated absorbed constituents are discharged into the lower part of the exhausting column under reduced pressure and the heated liquid residuum containing the heavier absorbed constituents is forced into the upper part of the exhausting column by the pressure in the preheater. In the exhausting column a part of gasoline constituents remaining absorbed in the liquid is vaporized upon the reduction in pressure, and the descending heated liquid residuum is directly contacted in countercurrent flow with the ascending heated vapors and gases under a relatively lower pressure, the liquid absorbent being substantially completely denuded of its remaining content of absorbed gasoline. In the section of the tower above the liquid residuum inlet the separated vapors containing the gasoline are subjected to rectification and any entrained or vaporized absorbent is separated from the gasoline. If for any reason, additional heat is required to complete the stripping of the absorbent, such as heat losses between the preheater and the exhausting column or too great cooling of the exhausting column because of the expansion or vaporization of the vapors and gases or the liquid residuum upon reduction of pressure, steam is supplied to the heating coil in the base of the column or passed directly up through the column through the perforated pipe at the base of the tower. This perforated pipe is shown in the drawing at the lower part of the liquid reservoir in the base of the exhausting column and steam discharged therethrough bubbles up through the liquid absorbent collecting in the reservoir. This direct steam inlet may also be arranged above the liquid level in the reservoir and directly introduced steam passed upwardly through the exhausting column with the vapors and gases from the preheater without being bubbled through the denuded absorbent.

When the operation is first started, sufficient of the gasoline charged absorbent is introduced into and through the preheater to fill the equalizing column to a point where the liquid just covers the lower outlet of the pipe 44 and to fill the preheater to a corresponding level. Heat is then applied to the gasoline charged absorbent in the preheater while further quantities of the charged menstruum are forced into the preheater through connection 9. The pressure within the preheater builds up as heat is applied, due to the further introduction of the charged absorbent and to the liberation of gases and vapors, until the liquid from the preheater is forced into the exhausting column 30 through the elevated connection 41. The liquid body in the equalizing column is at the same time raised to a corresponding elevation. When this point is reached, the liquid in the equalizing column 43 can rise no further due to the discharge of the liquid through connection 41, and the vapors and gases separated in the still then force their way out through the lower outlet of pipe 44, rising through the liquid in the equalizing column, and being discharged from the top of the equalizing column into the lower part of the exhausting column through connection 42. To assist in bringing the equalizing column up to this point of operation, the valve 49 may initially be closed or partly closed and gradually opened after the discharge of liquid through connection 41 begins.

In subsequent operation, the oil in the preheater is maintained at a point corresponding to the level of the lower end of the pipe 44 by the further introduction of gasoline charged absorbent. The liquid level in the equalizing column is determined by the elevation of the connection 41 to the exhausting column and the liquid level in the preheater by the level of the lower outlet of pipe 44 in the equalizing column so that during the operation of the apparatus these fixed levels are maintained in the equalizing column and in the preheating still. The pressure in the preheating still is greater than that in the exhausting column 30 by an amount equal to the hydrostatic pressure corresponding to the difference between the liquid levels in the still and in the equalizing column, this being the difference in head between the inlet 41 and the lower outlet of the pipe 44. The pressure upon the liquid from the preheater is reduced as it rises to the point of introduction into the exhausting column and the pressure upon the vapors and gases from the preheater is reduced as they rise through the liquid in the equalizing column. The equalizing chamber thus serves as an automatic means for regulating the level in the preheating still and for maintaining a predetermined excess pressure in the preheating still while regulating the pressure reduction upon both the vapors and gases and the liquid discharged into the exhausting column from the preheating still.

The regulation of the pressure in the preheating still and of the reduction in pressure between the preheating still and the exhausting column, and the regulation of the flow of vapors, gases and liquid from the preheating still to the exhausting column, thus effected may be supplemented and increased by partially closing the valves 49, 50, 51 and 52. Where the valve 49 is employed for this purpose, the valve 51 is correspondingly adjusted to maintain the equilibrium in the equalizing column 43 and where the valve 50 is so employed, the valve 52 is similarly adjusted to correspond to the adjustment of the valve 50.

There is also a pressure drop between the preheater and the exhausting column due to the friction head incident to the flow of the vapors and gases and the liquid through the connections between the preheater and the exhausting column so that the liquid levels in the preheater and in the equalizing column are not identical with the level of the lower outlet of pipe 44 and the level of the liquid inlet 41 to the exhausting column. Likewise, the pressure in the preheater, and the pressure drop between the preheater and the exhausting column, do not correspond exactly to these levels and the differences between them. Where supplementary regulation is effected by means of any of valves 49, 50, 51 or 52, the increased pressure reduction is not apparent in the differences between the levels maintained.

In order to make the discharge of vapors and gases from the pipe 44 through the liquid column in the equalizing cylinder 43 as uniform as possible, the lower edge of the nipple 46 is finely serrated to cause the discharge of the vapors and gases in a plurality of fine streams. Where the vapors and gases escape from the lower end of pipe 44 in relatively large bubbles, an irregular variation in the pressure ensues, tending to cause a variation in the discharge of liquid through the connection 41 and also tending to cause a variation in the level or surging of the liquid body in the preheating still 1. This latter effect is particularly objectionable where the level in the preheating still must be closely controlled, as is the case where stills of the fire-tube boiler type are employed. Any such surging effect is somewhat absorbed in the connections 11 and 41 and may also be reduced by providing a relatively small connection at 48 acting as an orifice assisting in preventing transmission of sudden variations to the liquid in the connections 11 and 41. The float actuated valve 12 on the outlet to the connection 11 may also be employed to supplement the regulation of the liquid level in the preheater. This valve, when so employed, is adjusted to maintain the liquid level in the preheater between fixed maximum and minimum limits, and prevents the liquid level in the preheater exceeding these limits irrespective of variations due to irregular discharge of vapors and gases through the equalizing column. If such a float actuated valve is employed, the outlet of the pipe 44 is arranged at a point corresponding to a level between these maximum and minimum limits.

Where there is no provision for flow of liquid through the equalizing column, the vapor discharged through the liquid therein may tend to be absorbed, in part, in the liquid thereby decreasing its density, or the hot vapors may tend to distill a part of the absorbed constituents remaining in the liquid discharged from the preheating still thereby increasing its density. Such variations tend to become cumulative, and in time, by altering the density of the liquid in the equalizing column, may materially change the liquid level therein corresponding to the pressure necessary to force the hot liquid residuum from the preheater into the exhausting column through the connection 41. To minimize variation in the character of the liquid within the equalizing column, and to prevent cumulative change in its character, a small amount of the liquid is continuously withdrawn from the top of the equalizing column through the by-pass or bleeder connection 53, being replaced by liquid fresh from the preheating still through connection 48.

To conserve heat, and to prevent condensation in the equalizing column of the vapors separated from the absorbent in the preheating still, the equalizing column and the connections between the equalizing column and the preheater and the exhausting column are thoroughly lagged or heat insulated.

Figure 5:
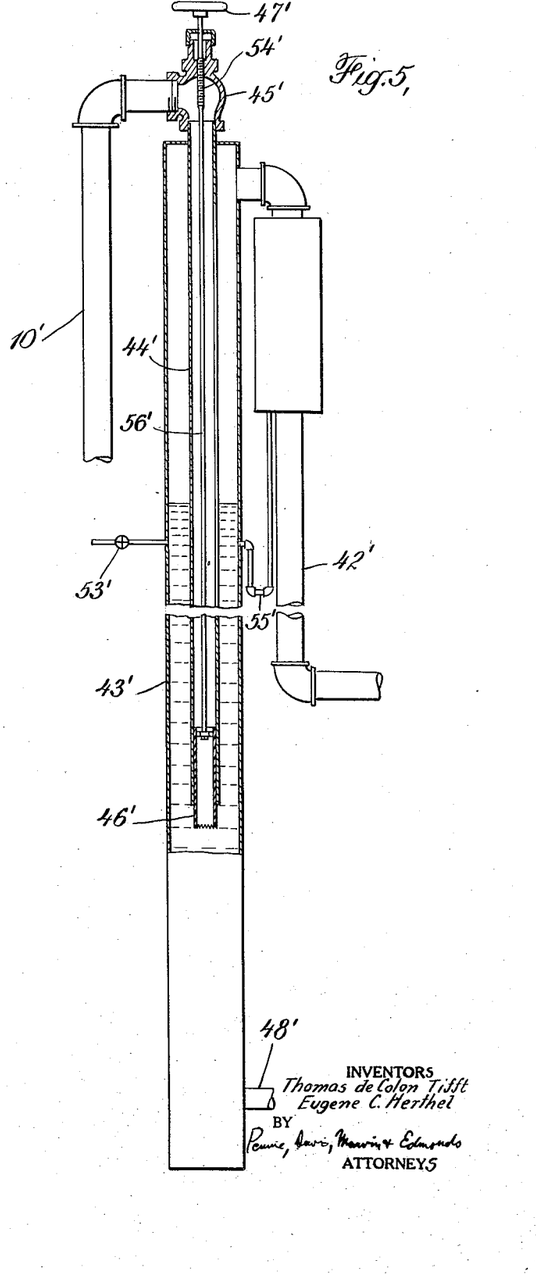

In the equalizing column illustrated in Fig. 5, the cylinder 43' is a pipe section with closed ends. A pipe 44' extends downwardly within the cylinder to a point just above the liquid level in the preheating still with which the equalizing column is connected. The vapors and gases from the preheating still enter the equalizing column through connection 10' and the angle connection 45'. A pipe section 46', having its lower edge serrated, is slidably mounted within the lower end of the pipe 44'. The pipe section or nipple 46' is fastened by means of a spider in the upper end of the nipple to a rod 56' extending upwardly within the pipe 44'. The angle connection 45' may be an angle valve from which the seat and valve disc have been removed. The rod 56' is fastened to the stem 54' of the valve construction so that by rotation of the hand wheel 47' the lower edge of the nipple 46' may be vertically adjusted. The vapors and gases escape from the upper end of the equalizing column through connection 42', after bubbling through the liquid therein. A trap for the separation of entrained liquid is interposed in this connection, and a liquid return line 55' is provided between the trap and the liquid in the equalizing column. A pipe 48' is provided at the lower end of the cylinder 43' to afford communication between the liquid in the cylinder 43' and the liquid body in the preheating still. A valved bleeder line 53' is provided for replacement of the liquid within the equalizing column.

Figure 2:
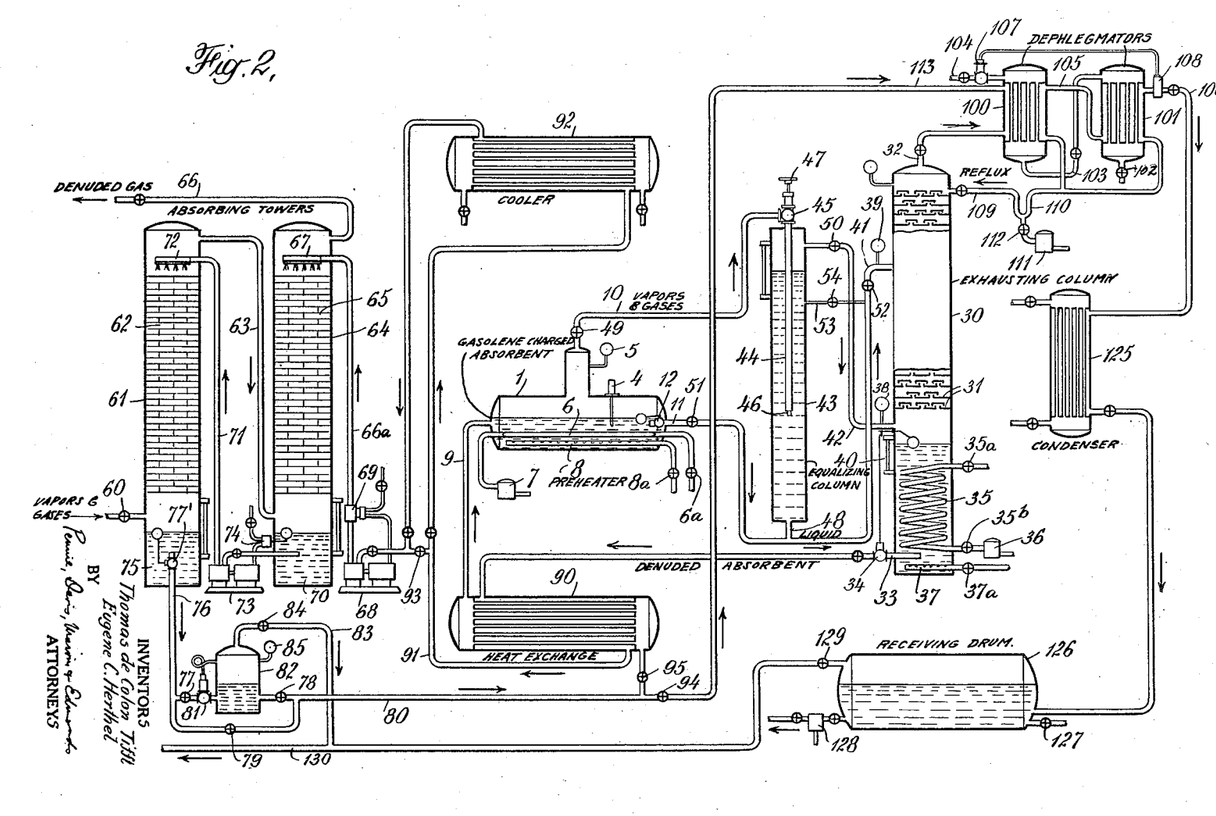
Fig. 2 diagrammatically represents in elevation and partly in section a system for gasoline recovery embodying the invention and adapted for carrying out the invention.
Figure 3:
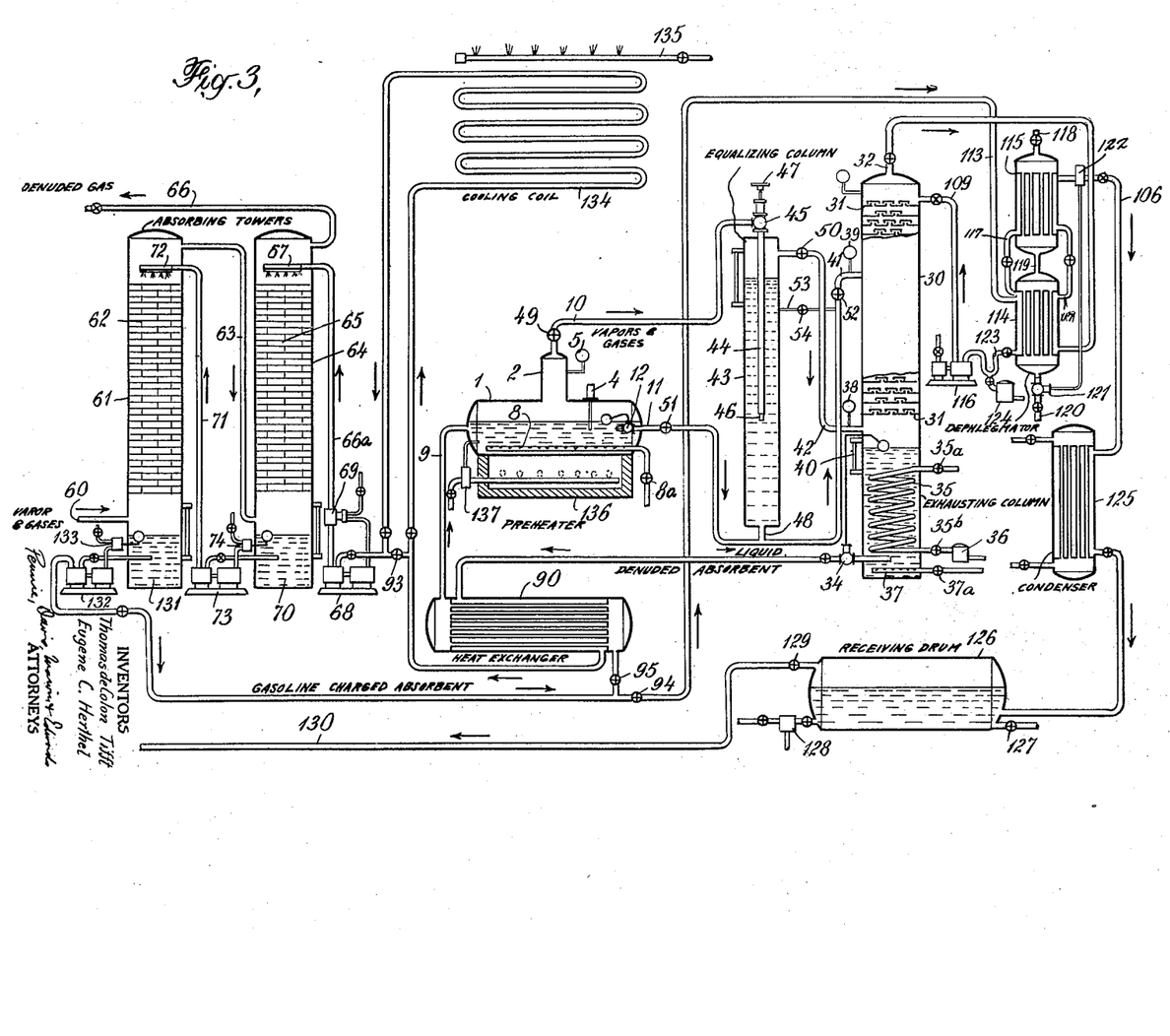
Fig. 3 diagrammatically represents in elevation and partly in section a somewhat modified system for gasoline recovery and adapted for carrying out the invention, and Fig. 5 diagrammatically represents in elevation and partly in section, on an enlarged scale, a somewhat modified form of the equalizing and pressure reducing apparatus of the invention.

Figs. 2 and 3 diagrammatically illustrate a complete system embodying the invention for recovering gasoline from natural gas or casinghead gas in accordance with the process of the invention. In carrying out the process of the invention in the apparatus of the type illustrated, in Figs. 2 and 3 the natural gas or casinghead gas containing the gasoline to be absorbed is passed through absorbing towers wherein it is contacted with the cooled liquid absorbent, the charged absorbent is passed through a heat exchanger to a preheater in which an initial separation of gases and vapors is effected, by distillation under pressure, the pressure upon the separated vapors and gases and liquid is reduced, the separated gases and vapors and the liquid residuum are passed in countercurrent and in direct contact in an exhausting column in which the absorbent is substantially completely removed, the denuded absorbent is circulated through the heat exchanger giving up a part of its heat to the charged absorbent entering the preheater and after further cooling, if necessary, is returned to the absorbers, the vapors and gases separated from the absorbent in the exhausting column are passed through a rectifier and thence through one or more dephlegmators, any dephlegmate is returned to the rectifier and exhausting column, and the final gasoline fraction escaping from the dephlegmators as a vapor is condensed and collected.

Referring to Fig. 2, the natural gas or casing head gas containing the gasoline vapors is introduced through connection 60 into the lower part of the first absorbing tower 61, passed upwardly through baffles or filling material 62, conducted from the top of the first tower to the lower part of the second absorbing tower 64 through connection 63 and passed upwardly through baffles or filling material 65 therein, and the stripped gas is exhausted from the upper end of the second tower through connection 66. The fresh liquid absorbing medium is introduced into the top of the second absorbing tower through connection 66$^a$ and sprayhead 67 by means of pump 68. A governor 69 is provided actuated by a flow-rate mechanism in the connection 66 for controlling the operation of the pump 68 so as to maintain a constant rate of flow of the liquid absorbing medium. In the absorbing tower 64, the liquid absorbent is distributed over the filling material through the sprayhead and is passed downwardly in direct contact and in countercurrent flow with the ascending partially stripped gas from the first absorbing tower. The partially charged absorbent collects in the liquid reservoir 70 in the lower part of the tower 64 and is introduced into the top of the first tower through connection 71 and sprayhead 72 by means of pump 73. A float actuated governor 74 is provided for controlling the operation of the pump 73 to maintain the liquid level in the reservoir 70, above the outlet connection to the pump 73 and below the gas inlet of connection 63. In the tower 61 the partially charged absorbent is passed downwardly in countercurrent flow and in direct contact with the ascending fresh gas. The charged absorbent collects in the liquid reservoir 75 in the lower part of the tower 61. From the reservoir 75 the charged absorbent is discharged through connection 76 in which a flow actuated valve 77' is interposed for maintaining the liquid level in the reservoir below the gas inlet and above the liquid outlet.

Where the pressure prevailing in the absorbing towers is just sufficient to force the charged absorbent through the heat exchanger 90 into the preheater 1 and to maintain the required pressure in the preheater, the valves 77 and 78 are closed and the valve 79 opened, the charged absorbent being discharged directly from the liquid reservoir 75 through connection 80. Where a somewhat higher pressure prevails in the absorbers and it is desirable to reduce the pressure between the absorbers and the preheater, the valve 79 is closed and the valves 77 and 78 are opened and the charged absorbent is passed through the reducing valve 81 and the vent tank 82 where the pressure is reduced to the desired value and the liquid absorbent discharged through connection 80, any separated gases and vapors being withdrawn through connection 83, the withdrawal being regulated by means of valve 84. The vent tank may be provided with a level gauge to assist in regulating the withdrawal of vapors and gases and a pressure gauge 85 to assist in regulating the pressure reduction. In place of the arrangement of the vent tank and the expansion valve illustrated in Fig. 2, the arrangement of vent tank and expansion valve illustrated in Fig. 4 may be substituted.

Figure 4:
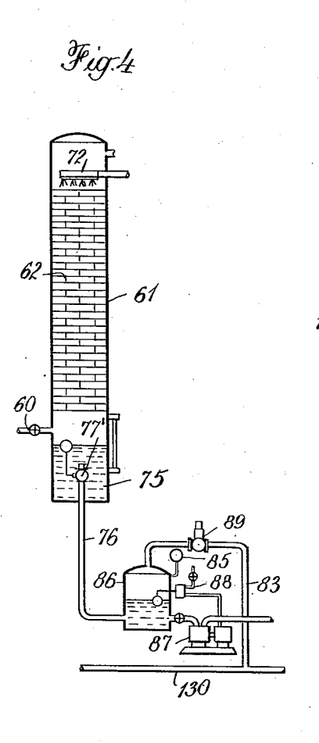
Fig. 4 is a modified form of one of the elements illustrated in Fig. 2.

Referring to Fig. 4, the charged absorbent from the reservoir 75 in the absorbing tower 61 is discharged directly into the vent tank 86 through connection 76. The charged absorbent is withdrawn from the vent tank by means of a pump 87, which acts as a reducing valve, and which is controlled by a float actuated governor 88. An expansion valve 89 in the vent connection 83 serves to reduce the pressure upon any vapors and gases liberated within the vent tank 86. Where a vent tank is employed, as in either Fig. 2 or Fig. 4, some gases and vapors are liberated from the absorbent upon the reduction of pressure, and by withdrawing these from the vent tank a part of the lighter constituents is removed without loading the preheater or preliminary still. The specific heat of such vapors and gases as are liberated is however very low, in many cases entailing only a negligible heat loss, and the vent tank and its auxiliaries may be eliminated by an expansion valve in the discharge line. With a constant flow of liquid absorbent, the float valve 77' may be employed to effect the pressure regulation, or the regulation of the valve 77' may be supplemented or replaced by regulation of a valve between connections 76 and 80, as by regulation of valve 79. With higher pressures in the absorbers it is advantageous to employ a vent tank in the line in conjunction with the pressure reducing means, but with intermediate pressures direct valve control of the pressure reduction is usually satisfactory.

The heat exchanger 90 is of the shell and tube type. The charged absorbent passing to the preheater through connection 80 is circulated through the tubes. The denuded absorbent from the exhausting column is circulated about the tubes and is discharged through connection 91. The denuded absorbent escaping from the heat exchanger 90 is circulated through the cooler 92 on its way to the pump 68. Where the cooling effected in the heat exchanger 90 is sufficient or where it is desirable to limit the degree of extraction effected in the absorbers, as to prevent or reduce the extraction of the lighter vapors and gases, all or a part of the absorbent leaving the heat exchanger 90 may be by-passed around the cooler 92 through valved connection 93. From the heat exchanger 90 the charged absorbent is introduced into the preheater 1 through connection 9.

The operation and construction of the preheater 1, the equalizing column 43, and the exhausting column 30 have been described in detail in connection with Fig. 1. In the preheater a partial vaporization of the absorbed constituents is effected, and, after reduction of pressure through the equalizing column, the preheated vaporized constituents and the preheated liquid are discharged into the exhausting column. The preheater 1, in Fig. 2, is shown as heated by a steam coil connected with a steam trap and the temperature within the preheater may be regulated by regulating the pressure of the steam in the coil 6, withdrawing the condensed water from the trap 7. Heat may also be supplied, and, due to the reduction of the partial pressure of the vaporized constituents the temperature of vaporization lowered, by the introduction of direct steam through perforated pipe 8.

The pressure upon the vapors and gases and the liquid is then reduced and the hot liquid from the preheater from which the lighter absorbed constituents have been distilled is introduced into the upper part of the exhausting column 30 and the hot vaporized constituents are introduced into the lower part of the column 30. In the exhausting column, a further part of the absorbed constituents is vaporized due to the reduction in pressure. The hot vapors and gases bubble upwardly through the descending liquid being scrubbed of any vaporized or entrained absorbent and, under the lower pressure prevailing in the exhausting tower, any remaining absorbed constituents are vaporized from the liquid. The denuded absorbent is returned from the reservoir in the lower part of the tower through the heat exchanger 90 and the cooler 92 to the absorbing tower. The vapors and gases separated from the absorbent pass upwardly through the upper section of the tower 30 above the inlet of the connection 41 and undergo rectification therein, the uncondensed vapors and gases escaping to the dephlegmators through connection 32.

Two dephlegmators, 100 and 101, of the shell and tube type are shown in Fig. 2, connected in series with respect to both the cooling fluid and the vapors and gases undergoing dephlegmation, but one or a greater number of dephlegmators of this or other construction may be employed. The cooling fluid enters the second dephlegmator 101 through connection 102, passes through the tubes therein to the first dephlegmator 100 through connection 103, and escapes therefrom through connection 104. The vapors and gases enter the first dephlegmator through connection 32, pass about the tubes therein to the second dephlegmator through connection 105, and escape from the second dephlegmator through connection 106. A thermostatically operated valve 107 is provided in the cooling fluid outlet 104 actuated by the thermostat 108 in the vapor outlet 106 for controlling the cooling and condensation within the dephlegmators. From the dephlegmators any condensate is returned to the upper part of the rectifying section of the column 30 through connection 109 having a liquid seal trap 110 therein. A trap 111 is connected to the lowest point of the seal 110 for removing any water condensed in the dephlegmators where direct steam is employed in the preheater or exhausting column. Where the removal of water at this point is not desired, the valve 112 is closed disconnecting the trap. The reflux returned to the rectifying section of the tower 30 assists in the rectification, and the character of the final product can, within limits, be controlled by regulation of the character and quantity of reflux. The character and quantity of reflux from the dephlegmators can be controlled by regulation of the temperature and amount of cooling fluid circulated therethrough.

The dephlegmation in the dephlegmators 100 and 101 can also be controlled and in part effected by the introduction into the dephlegmators of a regulated amount of gasoline charged absorbent. In Fig. 2, a connection 113 is shown for by-passing a part of the gasoline charged absorbent from the absorbers 61 and 64 from connection 80 into the first dephlegmator 100. Regulation of the amount of gasoline charged menstruum so introduced into the first dephlegmator is effected by adjustment of valves 94 and 95. The absorbent and any unvaporized part of the absorbed constituents, after passing through the dephlegmator, is returned to the tower 30 with the reflux, and in passing through the tower is stripped of any remaining absorbed gasoline. This stripped absorbent also collects in the reservoir at the base of the tower and is returned to the absorbers through connection 33.

The vapors escaping through connection 106 pass through the condenser 125, shown of the shell and tube type, and the condensate is collected in the receiving drum 126. The finished gasoline product is withdrawn through the valved outlet 127; or where direct steam is employed and the condensate in the drum 126 includes some water, the gasoline product may be withdrawn through the separating trap 128. Any vapors and gases collecting in the receiver are withdrawn through the valved outlet 129, escaping through connection 130.

The apparatus illustrated in Fig. 3 is in several respects sufficiently similar to that shown and described in Fig. 2 so that a separate description is unnecessary with respect to these corresponding features.

As in Fig. 2, the natural gas or casinghead gas enters the first absorbing tower through connection 60 and the stripped gas leaves the second absorbing tower through connection 66. Excepting the means for removing the charged absorbent from the first tower, the operation and construction of these towers and the absorbent circulating pumps are the same as has been described in connection with Fig. 2.

The construction illustrated in Fig. 3 is particularly adapted for carrying out the absorption under relatively low pressure, including pressures lower than that employed in the preheater. The gasoline charged absorbent collects in the reservoir 131 in the lower part of the first tower 61 and is withdrawn therefrom by means of pump 132. A float actuated governor 133 is provided for controlling the operation of the pump 132 to maintain the liquid level in the reservoir 131 above the outlet connection to the pump 132 and below the gas inlet connection 60. The pump 132 forces the gasoline charged menstruum through the heat exchanger 90 into the preheater 1.

In place of a cooler of the shell and tube type, as illustrated at 92 in Fig. 2, an atmospheric cooling coil 134 over which water or other cooling fluid is distributed from perforated pipe 135 is provided for cooling the returned denuded absorbing medium. An atmospheric cooler is of advantage where cooling water of satisfactory quality for use in a shell and tube type cooler is not readily available or where it is desirable to supplement the cooling action of the sensible heat of the cooling water by the heat of evaporation of part of the water. Likewise, an atmospheric cooler or condenser may be used in place of or as a supplementary cooler in connection with the condenser 125.

The preheater 1 is heated over a gas or oil fired furnace 136 and a thermostatically operated valve 137 is provided for regulating the temperature in the preheater or preliminary still by controlling the rate of combustion in the furnace.

In the apparatus illustrated in Fig. 2, the dephlegmators 100 and 101 are arranged to provide for return of the dephlegmate to the tower 30 by gravity. In the apparatus illustrated in Fig. 3, the dephlegmate is returned to the tower 30 by means of a pump 116. The vapors and gases from the tower 30 enter the first dephlegmator 114 through connection 32, pass about the tubes therein to the second dephlegmator 115 through connection 117, and escape from the second dephlegmator through connection 106. The cooling fluid enters the second dephlegmator through connection 118, passes through the tubes therein to the first dephlegmator through connection 119, and escapes therefrom through connection 120, flowing through the dephlegmators in counter current to the flow of vapors and gases. A thermostatically operated valve 121, in the cooling fluid outlet 120 and actuated by the thermostat 122 in the vapor outlet 106, is provided for controlling the cooling and condensation within the dephlegmators. The dephlegmate collecting in the lower part of the space about the tubes in the lower dephlegmator 114 is withdrawn through connection 123 and forced into the upper part of the tower 30 through connection 109 by means of pump 116. A trap 124, connected to the connection 123 through a valve, is provided for removing any water condensed in the dephlegmators where direct steam is employed in the preheater or exhausting column. Valve controlled connection 113 is provided for introducing gasoline charged absorbent into the lower dephlegmator, the menstruum and any unvaporized absorbed constituents of any absorbent so introduced being returned to the tower 30 by means of pump 116 with the dephlegmate.

In carrying out the complete process for recovering gasoline, the natural gas or casinghead gas is first contacted with a liquid absorbent in amount sufficient to remove the major part of the gasoline content of the gas. Increased recovery can be had by increasing the ratio of the amount of absorbent used to the amount of gasoline recovered, but practical considerations, such as the increased amount of power and the larger apparatus required to handle larger amounts of liquid absorbent and the increased amount of heat required to distill the absorbed gasoline from relatively large amounts of liquid absorbent usually limit the amount that can be employed so that 100% recovery is not commercially practicable. The ratio of the amount of absorbent medium employed to the amount of gasoline present in the gas may be kept fairly constant, and in this case it is advantageous to employ a higher pressure during the absorption treatment in the treatment of a leaner gas than in the treatment of a richer gas. A ratio of 20 gallons of mineral seal oil per gallon of gasoline to be recovered, for example, can be used. A comparatively lean gas, containing for example about .10 gallons per 1000 cubic feet can be stripped, employing this ratio of absorbent, to about .010 or .015 gallons per 1000 cubic feet under a pressure of about 300 pounds per square inch. A gas containing about 2.25 gallons per 1000 cubic feet can, with a similar absorbent ratio be stripped to about .10 or .15 gallons per 1000 cubic feet under a pressure of about 40 pounds per square inch. Other suitable liquid absorbents for absorbing gasoline from natural gas and casinghead gas comprise, for example, naphtha, kerosene, gas oil, straw oil, light lubricating oil, and cresol. The invention is of particular advantage in the separation of absorbed gasoline from lighter and lower boiling absorbents. The ratio of absorbent to gasoline to be employed varies with the recovery desired and other factors such as the practical limits referred to above. In general, the absorptive capacity of lighter hydrocarbons is higher than of similar heavier hydrocarbons, and with a lighter hydrocarbon absorbing medium the ratio can be somewhat decreased. The recovery of gasoline from the natural gas or casinghead gas can also be increased by lowering the temperature of the absorbent or by increasing the pressure in the absorbers.

With a mineral seal oil absorbent containing approximately 5% of absorbed gasoline, a temperature of from 400° F. to 450° F. may be maintained in the preheater in conjunction with a pressure of about 20 pounds per square inch, where direct steam is not employed. With direct steam a somewhat lower temperature can be used. The temperature in the preheater is adjusted in accordance with the amount of heat it is necessary to introduce in the preheater to effect complete separation in the exhausting column. The pressure in the preheater is adjusted, with reference to the temperature, in accordance with the amount of partial vaporization desired in the preheater, the vaporization being less, in any given case, the higher the pressure. Between the preheater and the exhausting column the pressure is reduced so that, with the total amount of heat available, complete separation of the absorbed gasoline is effected in the exhausting column. With a pressure in the preheater of 20 pounds per square inch, the pressure in the exhausting column may be maintained at a value just sufficient to force the vapors and gases through the dephlegmators and condenser to the receiver, say for example 5 pounds per square inch.

The gas and vapors collecting or liberated in the receiver for the condensed gasoline product may be withdrawn through connection 130, together with the vent gases from the vent tank where such a vent tank is employed for reducing the pressure between the absorbers and the preheater, and subjected to recompression for the recovery of its gasoline content. The recoverable gasoline content of this gas vapor mixture may amount to as much as 8 galons per 1000 cubic feet or more, although with increased cooling or better lagging, or by maintaining a higher pressure upon the receiver, the amount may be reduced to 2 gallons per 1000 cubic feet or less.

The absorbing towers are designed in accordance with the quantity and quality of natural gas or gasoline to be treated. The preheater and exhausting column, and the heat exchangers and coolers for the liquid absorbent, are designed in accordance with the volume of absorbent employed from which gasoline is to be separated. The rectifying part of the tower, the dephlegmators and the condenser for the gasoline product are designed in accordance with the quantity and quality of gasoline to be recovered. For example, for treating about 8,000,000 cubic feet of gas per day under a pressure of about 30 to 40 pounds per square inch, two towers 9 feet in diameter, the gas and oil being contacted over a column about 26 feet high in each tower, can be used. Or for treating about 3,500,000 cubic feet of gas per day, two columns 6 feet in diameter effecting gas-absorbent contact over a space of about 16 feet can be employed. In general, a linear gas velocity of about .5 feet per second in the absorbers can be used. The velocity should not be so great as to cause entrainment of the absorbent in the gas; too low velocity however makes the bulk of the apparatus excessive.

For the recovery of about 15,000 gallons of gasoline per day from about 300,000 gallons of absorbent, a preheater having a capacity equivalent to about 90 horsepower can be used, for example, two fire tube boilers having 450 square feet of heating surface each can be employed. The design of the exhausting tower depends largely upon the type of tower construction employed: The desideratum in any case is the complete stripping of the absorbent. For the recovery of 15,000 gallons of gasoline per day from about 300,000 gallons of absorbent, a series of 20 bubble plates 5 feet in diameter and having 17 bubble caps 8 inches in diameter on each plate can be used. Another series of 10 similar plates, arranged in the tower above the liquid inlet can be employed as a rectifier.

The entire apparatus can be and preferably is thoroughly heat insulated or lagged to prevent heat loss. To assist in regulation of the operation, thermometers or other temperature indicating devices can be arranged in the gas inlets and outlets and absorbent inlets and outlets in the absorbers, on the inlets and outlets of the heat exchangers and the absorbent coolers, on the vapor and gas and the liquid outlets from the preheater, on the exhausting column inlets from the preheater and in the vapor outlet and liquid reservoir in the preheater, on the cooling fluid connections, the vapor inlets and outlets and the reflux return line of the dephlegmators, and on the condenser for the final gasoline product.

In place of using steam for direct introduction into the charge in the preheater, or into the exhausting column, stripped gas, for example, gas that has passed through the absorbers or tail gas from the recompression plant where the vent gases from the receiver are recompressed, may be employed. The stripped gas may be introduced at ordinary temperature for reducing the partial pressure of the absorbed gasoline constituents, or it may be heated before introduction for supplying heat as well as for assisting vaporization by reduction of the partial pressure of the gasoline constituents. Where such gas is introduced, it passes through the system with the gasoline vapors and can be separated from the condensed gasoline in the final receiver. Additional cooling of the final gasoline fraction may be desirable where stripped gas is employed in this manner.

The application of the process of the invention to the complete process of gasoline recovery has been more particularly described in connection with an operation in which superatmospheric pressure is maintained upon the charge in the preheater or preliminary still. The invention, in its broader aspect, is also applicable where the maintenance of a lower pressure in the exhausting column than that prevailing in the still or preheater is desired and where the pressure in the preheater is atmospheric or subatmospheric.

We claim:

1. A process of separating absorbed gasoline from liquid absorbing mediums, which comprises subjecting the gasoline charged medium to a distillation treatment under pressure by the application of heat, reducing the pressure upon the vapors and gases and the liquid separated in the distillation treatment by discharge through liquid columns whereby a pressure reduction corresponding to the hydrostatic head of the columns is effected, and then passing the liquid from the distillation treatment in countercurrent flow and in direct contact with the distilled vapors and gases under a pressure lower than that prevailing in the distillation treatment.

2. A process of separating absorbed gasoline from liquid absorbing mediums, which comprises subjecting the gasoline charged medium to a distillation treatment by the application of heat, reducing the pressure upon the vapors and gases and the liquid separated in the distillation treatment by discharge through liquid columns whereby a pressure reduction corresponding to the hydrostatic head of the columns is effected, and then passing the heated liquid residuum from the distillation treatment in countercurrent flow and in direct contact with the distilled vapors and gases under the reduced pressure.

3. A process of separating absorbed gasoline from liquid absorbing mediums, which comprises subjecting the gasoline charged absorbent to a distillation treatment by the application of heat, discharging the liquid from the distillation treatment into an exhausting receptacle at a point above the liquid level maintained in the distillation treatment whereby a corresponding pressure reduction is effected upon the liquid, discharging the distilled vapors and gases into the exhausting receptacle through a liquid column whereby a pressure reduction corresponding to the hydrostatic head of the column is effected upon the vapors and gases, and directly contacting in countercurrent flow in the exhausting receptacle the vapors and gases and the separated liquid.

4. A process of separating absorbed gasoline from the liquid absorbing mediums, which comprises subjecting the gasoline charged absorbent to a distillation treatment by the application of heat, discharging the liquid from the distillation treatment into an exhausting receptacle at a point above the liquid level maintained in the distillation treatment whereby a corresponding pressure reduction is effected upon the liquid, discharging the distilled vapors and gases into the exhausting receptacle through a liquid column whereby a pressure reduction corresponding to the hydrostatic head of the column is effected upon the vapors and gases, maintaining communication between the liquid in the distillation treatment and the liquid in the pressure reducing column whereby the pressure reduction upon the vapors and gases and the liquid is equalized, and directly contacting in countercurrent flow in the exhausting receptacle the vapors and gases and the separated liquid.

5. A process of separating absorbed gasoline from liquid absorbing mediums, which comprises subjecting the gasoline charged absorbent to a distillation treatment by the application of heat, discharging the liquid from the distillation treatment into an exhausting receptacle at a point above the liquid level maintained in the distillation treatment whereby a corresponding pressure reduction is effected upon the liquid, discharging the distilled vapors and gases into the exhausting receptacle through a liquid column whereby a pressure reduction corresponding to the hydrostatic head of the column is effected upon the vapors and gases, maintaining communication between the liquid in the distillation treatment and the liquid in the pressure reducing column, controlling the level in the distillation treatment by regulating the point of discharge of the vapors and gases from the distillation treatment into the pressure reducing column, and directly contacting in countercurrent flow in the exhausting receptacle the vapors and gases and the separated liquid.

6. In an apparatus for separating absorbed gasoline from liquid absorbing mediums, a preheating still and means for supplying heat thereto, an exhausting receptacle, connections for conducting vapors and gases from the still to one end of the exhausting receptacle and for conducting liquid from the still to the other end of the exhausting receptacle, and means in these connections comprising liquid columns through which the vapors and gases and the liquid from the still are discharged for reducing the pressure between the still and the exhausting receptacle.

7. In an apparatus for separting absorbed gasoline from liquid absorbing mediums, a preheating still and means for supplying heat thereto, a vertically arranged exhausting column, a connection arranged for discharging liquid from the still into the upper part of the exhausting column at a point above the liquid level in the still, a vertically arranged passage extending above the level of the liquid inlet to the exhausting column, a connection between the lower part of this passage and the above named connection, a connection for introducing vapors and gases from the still into the passage at an intermediate point, and a connection for conducting the vapors and gases from the upper part of the passage to the lower part of the exhausting column.

8. In an apparatus for separating absorbed gasoline from liquid absorbing mediums, a preheating still and means for supplying heat thereto, a vertically arranged exhausting column, a connection arranged for discharging liquid from the still into the upper part of the exhausting column at a point above the liquid level in the still, a vertically arranged passage extending above the level of the liquid inlet to the exhausting column, a connection between the lower part of this passage and the above named connections, a connection for introducing vapors and gases from the still into the passage at a point corresponding to the liquid level in the still, and a connection for conducting the vapors and gases from the upper part of the passage above the level of the liquid inlet to the exhausting column to the lower part of the exhausting column.

9. In an apparatus for separating absorbed gasoline from liquid absorbing mediums, a preheating still and means for supplying heat thereto, a vertically arranged exhausting column, a connection arranged for discharging liquid from the still into the upper part of the exhausting column at a point above the liquid level in the still, a vertically arranged passage extending above the level of the liquid inlet to the exhausting column, a connection between the lower part of this passage and the above named connection, a connection for introducing vapors and gases from the still into the passage at a point corresponding to the liquid level in the still, means for vertically adjusting the point of discharge of the vapors and gases from the still into the passage for regulating the liquid level in the still, and a connection for conducting the vapors and gases from the upper part of the passage to the lower part of the exhausting column.

10. In an apparatus for separating absorbed gasoline from liquid absorbing mediums, a preheating still and means for supplying heat thereto, a vertically arranged exhausting column, a connection arranged for discharging liquid from the still into the upper part of the exhausting column at a point above the liquid level in the still, a vertically arranged passage extending above the level of the liquid inlet to the exhausting column, connections for introducing vapors and gases from the still into the passage at an intermediate point and for conducting vapors and gases from the upper part of the passage to the lower part of the exhausting column, a connection between the lower part of the passage and the first named connection for discharging the liquid from the still, and a connection between the passage and the exhausting column communicating with the passage below the liquid level therein.

In testimony whereof we affix our signatures.

EUGENE C. HERTHEL.
THOMAS DE COLON TIFFT.